(12) United States Patent
Lehmann et al.

(10) Patent No.: US 8,501,876 B2
(45) Date of Patent: Aug. 6, 2013

(54) GLASS PRINTING INK OR LACQUER OF EPOXY RESIN, OTHER RESIN AND PHOTOINITIATOR

(75) Inventors: Saskia Lehmann, Lenningen (DE); Wolfgang Schaefer, Horb (DE)

(73) Assignee: Marabuwerke GmbH & Co. KG (DE)

( * ) Notice: Subject to any disclaimer, the term of this patent is extended or adjusted under 35 U.S.C. 154(b) by 683 days.

(21) Appl. No.: 10/576,706

(22) PCT Filed: Oct. 20, 2004

(86) PCT No.: PCT/EP2004/011858
§ 371 (c)(1),
(2), (4) Date: Jan. 8, 2007

(87) PCT Pub. No.: WO2005/040055
PCT Pub. Date: May 6, 2005

(65) Prior Publication Data
US 2007/0213427 A1   Sep. 13, 2007

(30) Foreign Application Priority Data

Oct. 21, 2003   (DE) .................................. 103 49 394

(51) Int. Cl.
| | | |
|---|---|---|
| C08K 3/22 | (2006.01) | |
| C08L 63/00 | (2006.01) | |
| C08L 63/02 | (2006.01) | |
| C08L 63/10 | (2006.01) | |
| C08L 67/07 | (2006.01) | |

(52) U.S. Cl.
USPC ............ 525/438; 523/427; 523/454; 523/457; 523/458; 523/461; 523/466; 523/468; 525/524; 525/529; 525/532

(58) Field of Classification Search
None
See application file for complete search history.

(56) References Cited

U.S. PATENT DOCUMENTS

| | | | |
|---|---|---|---|
| 3,551,235 A | 12/1970 | Bassemir et al. | |
| 3,551,246 A | 12/1970 | Bassemir et al. | |
| 3,551,311 A | 12/1970 | Nass et al. | |
| 3,558,387 A | 1/1971 | Bassemir et al. | |
| 4,104,143 A | 8/1978 | Wasilewski et al. | |
| 4,104,413 A | 8/1978 | Wynn et al. | |
| 5,118,567 A * | 6/1992 | Komiyama et al. | 428/345 |
| 5,346,933 A * | 9/1994 | Knell | 523/427 |
| 5,411,768 A | 5/1995 | Knell et al. | |
| 5,476,748 A * | 12/1995 | Steinmann et al. | 430/269 |
| 5,476,752 A * | 12/1995 | Noguchi et al. | 430/287.1 |
| 5,656,336 A * | 8/1997 | Kamen et al. | 427/511 |
| 6,232,361 B1 | 5/2001 | Laksin et al. | |
| 6,413,696 B1 | 7/2002 | Pang et al. | |
| 6,485,885 B1 * | 11/2002 | Oka et al. | 430/270.1 |
| 6,513,435 B2 | 2/2003 | Detzner | |
| 6,562,172 B1 | 5/2003 | Kamen et al. | |
| 2002/0104456 A1 | 8/2002 | Detzner | |
| 2007/0149667 A1 * | 6/2007 | Xu | 524/360 |

FOREIGN PATENT DOCUMENTS

| | | |
|---|---|---|
| DE | 2 343 589 A1 | 3/1974 |
| DE | 100 19 926 A1 | 10/2001 |
| EP | 1 086 403 B1 | 3/2001 |
| GB | 1 159 404 A | 7/1969 |
| GB | 2 029 433 A | 3/1980 |
| WO | 98/51746 | 11/1998 |
| WO | WO 99/06336 | 2/1999 |
| WO | 99/36482 A | 7/1999 |
| WO | 2004/035643 A1 | 4/2004 |

OTHER PUBLICATIONS

Derwent accession No. 1974-19813V for German Patent No. 2,343,589, Mar. 7, 1974, Dr Finckh & Co AG, one page.*
CAPLUS accession No. 1974:465382 for German Patent No. 2,343,589, Mar. 7, 1974, Dr Finckh & Co AG, one page.*
Polysciences, Inc. data sheet for Epon 1001F, 2009, one page.*
Notice of Opposition of EP Pat. No. 1 675 806, mailed Jun. 20, 2013.
D8 from Opposition: Formulation of inks, Apr. 13, 1998.
D9 from Opposition: Invoice History, Dec. 6, 2013.
D10 from Opposition: Letter from Mr. Brian Breidigan, Jun. 11, 2013.
D11 from Opposition: Inks & Solvents Catalogs, Feb. 2001.
D12 from Opposition: "What's New" Ceramics Industry, Feb. 1999.
D13 from Opposition: Letter Mr. Jonathan Sexton, Dec. 6, 2013.
D14 from Opposition: Invoices, Jan. 15, 2001.
D15 from Opposition: Invoices, Mar. 1, 2001.
D16 from Opposition: Chemical Formulation, Feb. 25, 2001.
D17 from Opposition: Chemical Formulation, Aug. 30, 2001.

* cited by examiner

*Primary Examiner* — Robert Sellers
(74) *Attorney, Agent, or Firm* — Factor Intellectual Property Law Group, Ltd.

(57) ABSTRACT

The invention relates to a glass printing ink and a glass printing lacquer comprising at least one pigment, at least one photoinitiator and at least two resins. One resin is an epoxy resin having an average molecular weight based on bisphenol A, diluted in a UV hardening monomer. Another resin is a resin which contains free functional amino, hydroxy, epoxy, acid, acid anhydride and/or acrylate groups. The invention also relates to the use of the glass printing ink and glass printing lacquer when printing a glass substrate and to a method for printing a glass substrate.

10 Claims, No Drawings

GLASS PRINTING INK OR LACQUER OF EPOXY RESIN, OTHER RESIN AND PHOTOINITIATOR

RELATED APPLICATIONS

This application claims the filing benefit of PCT Patent Application PCT/EP2004/011858, filed Oct. 20, 2004; which claims the filing benefit of DE 103 49 394.8, filed Oct. 21, 2003; of which the contents of these applications are incorporated herein by reference.

TECHNICAL FIELD

The invention relates to a UV hardening glass printing ink and UV hardening glass printing lacquer preferably for printing a glass substrate with such a printing ink or printing lacquer.

BACKGROUND OF THE INVENTION

In recent times, increasing use has been made in glass printing applications of UV hardening organic glass printing inks, which must be subjected to thermal post-treatment after hardening, instead of the previously used ceramic (inorganic) inks. This makes it possible to avoid the use of heavy metals, to gain access to a greater colour range (standard and mixed shades) and to achieve greater brightness and an elevated degree of gloss. Another advantage is the possibility to assess the colour shade directly after UV hardening. In contrast thereto, inorganic inks cannot be assessed until after stoving. They furthermore offer processing advantages, such as a faster heat treatment process (for example approx. 20 min in comparison with 90 min heat treatment) and a reduced heat treatment temperature (for example 160° C. in comparison with 500-700° C.), so reducing processing costs in comparison with processes using inorganic glass printing inks. The organic glass printing inks themselves, however, are more costly than conventional inorganic inks for printing glass.

The milder processing conditions in the printing method with organic glass printing inks ensure that the internal pressure resistance of bottles is not impaired. Organic glass printing inks are, however, not suitable for printing glass which must be post-treated at elevated temperatures, such as moulded glass for automotive applications or glass with high gloss gold print.

With currently available organic printing inks for glass, problems may arise in relation to covering power, mechanical resistance and water resistance. After a glass pretreatment, for example flame treatment, organic printing inks for glass are printed in a two-component printing method, i.e. with a coupling agent to be mixed into the printing ink, and then subjected to thermal post-treatment at temperatures of for example 140-200° C. for a specific period.

It would be desirable to simplify this printing method and so reduce costs. One option for simplification would be to eliminate the requirement to use a two-component printing process, i.e. to use a coupling agent. Another option would be to make thermal post-treatment superfluous.

WO 99/06336 discloses a method for printing glass, in which a glass ink, which comprises a bisphenol A epoxy resin is printed onto a glass substrate and is then hardened by means of radiation, wherein a coupling agent is optionally used.

The inventor found, however, that without further measures, such a glass printing ink and such a method do not yield either adequate adhesion of the glass ink to the glass substrate or adequate scratch and water resistance. Accordingly, in all the Examples of WO 99/06336, both a coupling agent was used and thermal post-treatment was performed at a temperature of 150° C. to 200° C. U.S. Pat. No. 5,656,336 A discloses a similar process, which also suffers from the same shortcomings.

The present invention is directed to resolving these and other matters.

SUMMARY OF THE INVENTION

The object of the present invention is to provide a glass printing ink and a glass printing lacquer which ensure adequate adhesive strength and scratch resistance without thermal post-treatment. A further object is to provide a use of the glass printing ink and of the glass printing lacquer in printing glass substrates and to provide an associated printing method.

These objects are achieved by a glass printing ink or a glass printing lacquer comprising at least two resins, which together yield a photo-hardenable mixture, and at least one photoinitiator, wherein one of the at least two resins comprises a bisphenol A based epoxy resin, diluted in a UV hardening monomer, and another of the at least two resins comprises a free functional amino, hydroxy, epoxy, acid, acid anhydride or acrylate groups; and, for the glass printing ink or glass printing lacquer, a method utilizing the glass printing ink or glass printing lacquer and printing a glass or a superficially vitreous substrate.

DETAILED DESCRIPTION OF THE PRESENT INVENTION

While this invention is susceptible of embodiment in many different forms, there is shown in the drawings and will herein be described in detail one or more embodiments with the understanding that the present disclosure is to be considered as an exemplification of the principles of the invention and is not intended to limit the invention to the embodiments illustrated.

One important advantage of the invention, apart from the mechanical properties of the cured ink or lacquer layer, is that the method is simplified in that, in both single component systems and two component systems, the desired mechanical properties are achieved without thermal post-treatment. Moreover, good resistance to moisture and water is obtained in many cases.

A glass printing ink and glass printing lacquer are taken to mean a printing ink or a printing lacquer which are suitable for printing on glass and vitreous surfaces, such as ceramics and tiles.

The glass printing ink according to the invention and the glass printing lacquer according to the invention contain as the resin constituent a bisphenol A based epoxy resin which preferably has a molecular weight in the range from 800 to 1500 (weight average). Such epoxy resins are commercially available. Particularly preferred examples are Rütapox-Harz 0194 from Bakelite AG; ARALDITE® GT 7072 from Vantico AG, K-401.1.32, CH-4002 Basel and Epikote 1055 from Brenntag.

The epoxy resin used according to the invention is dissolved in a monomer which is UV hardening, for example due to acrylate groups suitable for polymerisation. This monomer preferably comprises mono-, di- or higher polyacrylates or methacrylates, such as for example isobornyl acrylate, 2-phenylethyl acrylate, 2-(2-ethoxyethoxy)ethyl acrylate (EOEOEA), 1,6-hexanediol diacrylate (HDDA), dipropylene glycol diacrylate (DPGDA), neopentyl glycol diacrylate, dipentaerythritol hexaacrylate (DPHA), propoxylated glycerol triacrylate (GPTA), tripropylene glycol diacrylate, (TPGDA), dipentaerythritol pentaacrylate (DiPEPA), pentaerythritol triacrylate (PETIA), ethoxylated trimethylpropane triacrylate (TMPEOTA), dipentaerythritol acrylate (DPHA), tricyclodecanedimethanol diacrylate (TCD-DMDA), hydroxypropyl methacrylate (HPMA). 1,6-Hexanediol diacrylate is very particularly preferred.

The concentration of the epoxy resin in the monomer preferably amounts to 10 to 90 wt. %, preferably to 30 to 70 wt. %, very particularly preferably to 50 wt. %, relative to the mixture.

The concentration of the epoxy in the glass printing ink according to the invention and the glass printing lacquer according to the invention is generally 1 to 90 wt. % dry weight, relative to the total mass of the glass printing ink or of the glass printing lacquer; it preferably amounts to 5 to 20 wt. %, particularly preferably to 11 to 14 wt. % dry weight.

The glass printing ink according to the invention and the glass printing lacquer according to the invention additionally contain at least one further resin which comprises free functional amino, hydroxy, epoxy, acid, acid anhydride and/or acrylate groups. Resins which have proved particularly suitable are melamine acrylate resins (for example the silicon dioxide-reinforced NANOCRYL XP 21/0793 from Hanse Chemie (hanse chemie GmbH, Charlottenburgerstrasse 9, D-21502 Geesthacht, Germany) or the multifunctional melamine acrylate ACTILANE 890 from Akzo Nobel Resins (Akzo Nobel Resins by, German sales office, Industriestrasse 8, P.O. Box 100265, D-46422 Emmerich); Viaktin VTE 5967 from Surface Specialities UCB, Anderlechtstr. 33, B-1620 Drogenbos, and an acid-modified polyester acrylate (for example GENOMER* 7154 from Rahn, Dörflistrasse 120, Zurich, Switzerland; Ebecryl 770 from Surface Specialities UCB). Further suitable resins for combination are certain polyester resins (for example Roskydal UA XP 2416 from Bayer, Ebecryl 524 from Surface Specialities UCB) and epoxy acrylates (for example Inchemrez W 93IB50 from In Chem. Corp, P.O. Box 69, CH 1170 Aubonne).

The quantity of this further resin in the glass printing ink or the glass printing lacquer may vary widely. In general, the quantity is 5 to 90 wt. % dry weight, relative to the total mass of the glass printing ink or of the glass printing lacquer, preferably 5 to 40 wt. %, particularly preferably 10 to 30 wt. %. The purpose of this further resin is to make the glass printing ink or glass printing lacquer more pliable and less brittle and to increase the adhesion and scratch resistance thereof.

The glass printing ink according to the invention and the glass printing lacquer according to the invention may furthermore optionally also contain additional resins for further enhancement of the properties thereof. These resins may be selected from a wide range of resins, for example methyl methacrylate copolymers (for example Paraloid B-48N, Paraloid B60, Paraloid B-82 from Röhm & Haas Deutschland GmbH, In der Kron 4, D-60439 Frankfurt; Neocryl B-810 from Neoresins, Lurgiallee, D-60439 Frankfurt/Main); ethyl methacrylate (for example Paraloid B 72 from Rohm & Haas); butyl methacrylate copolymers (for example Degalan LP 65/12, Degalan LP 68/04 from Röhm GmbH & Co. KG, Kirschenallee, D-64293 Darmstadt); liquid epoxy resins (for example Polypox E 064 from UPPC GmbH, Rütapox-Harz 0164 from Bakelite AG, Araldite GY 250 from Vantico); unsaturated polyester resins (for example Haftharz LTH from Degussa Chemiepark Marl, Paul-Baumann-Str. 1, D-45764 Marl); saturated polyester resins (Dynapol L 912, Dynapol L 952 from Degussa).

Such additional resins may be present, for example, in a quantity of 1 to 50 wt. % dry weight, preferably of 3 to 10 wt. %, relative to the total mass of the glass printing ink or of the glass printing lacquer.

The glass ink according to the invention and the glass printing lacquer according to the invention contain at least one photoinitiator, usually two and possibly three or more photoinitiators, in order to initiate surface and deep hardening (crosslinking) of the glass ink under UV light. They may be selected from among conventional photoinitiators used in UV hardening printing inks and lacquers etc., for example, without being limited thereto, 1-hydroxycyclohexylacetophenone (Irgacure® 184 from Ciba SPEZIALTÄTEN-CHEMIE AG; Klybeckstrasse 141, Postfach, CH-4002 Basel), 2-methyl-1-[4-(methylthiophenyl)-2-morpholinopropan]-1-one (Irgacure 907® from Ciba), 2-benzyl-2-dimethylamino-1-(4-morpholinophenyl)-butan-1-one (Irgacure® 369 from Ciba), bis (2,4,6-tri-methylbenzoyl)phenylphosphine oxide (Irgacure® 819 from Ciba), 2-hydroxy-2-methyl-1-phenyl-1-propanone (Darocur® 1173 from Ciba), isopropylthioxanthone (ITX from Lambson), 2-chlorothioxanthone (CTX from Lambson), benzophenone, 2,4,6-trimethylbenzoyldiphenylphosphine oxide (TPO from BASF), ethyl 2,4,6-trimethylbenzoyl-phenylphosphinate (TPO-L from BASF) and methylbenzoyl formate (MBF from Lambson). The total quantity of photoinitiators generally amounts to 1 to 12 wt. %, preferably to 3 to 7 wt. %, relative to the total mass of the glass printing ink or of the glass printing lacquer.

Co-initiators may additionally be present, such as amines (for example MDEA from BASF, BASF Aktiengesellschaft, Carl-Bosch-Straβe 38, D-67056 Ludwigshafen) or amine-modified acrylates (for example Ebecryl P 115, Ebecryl 7100 from Surface Specialities UCB; Actilane 705, Actilane 715, Actilane 755 from Akzo Nobel Resins by, German sales office, Industriestrasse 8, D-46446 Emmerich; Laromer PO 94 F, Laromer LR 8869 from BASF; Craynor 503, Craynor 550 from Cray Valley, Immeuble le Diamant B, F-92970 Paris la Défense; Photomer 4775F from Cognis) in quantities of 1 to 5 wt. %, relative to the total mass of the glass printing ink or of the glass printing lacquer.

The pigments present in the glass printing ink according to the invention may comprise any desired pigments, for example titanium dioxide, zinc sulfide, pigment black, azodiaryl yellow, isoindole yellow, diarylide orange, quinacridone magenta, diketopyrrolo red, copper phthalocyanine blue, copper phthalocyanine green, dioxazine violet and diketo metal oxide. A fairly comprehensive list of further usable pigments is published in Colour Index International, Fourth Edition Online, 2001, published by the Society of Dyers and Colourists in conjunction with the American Association of Textile Chemists and Colorists. Special effect pigments, such as metal oxide-coated mica and metallic pigments, may also be used.

The quantity of coloured pigment usually amounts to 2 to 50 wt. %, preferably to 10 to 35 wt. %, relative to the total mass of the glass printing ink, depending on the type of pigment and the desired covering power. White pigment is normally used in a quantity of 20 to 50 wt. %, preferably of 30 to 40 wt. %.

The glass printing lacquer does not generally contain any pigment.

In general, further reactive diluents are added to the glass printing ink or the glass printing lacquer in addition to the UV hardening monomer, in which the bisphenol A based epoxy resin is dissolved. These reactive diluents, which are likewise UV hardening, may comprise the monomers discussed above in connection with the polyester solution. Still further compounds with a single ethylenically unsaturated bond may furthermore also be used, such as for example N-vinylpyrrolidone (NVP) and vinyl caprolactam. The quantities of additional reactive diluent used generally amount to 0 to 60 wt. %, preferably to 3 to 20 wt. %, in particular to 4 to 8 wt. %, for example to 6 to 7 wt. %, relative to the total mass of the glass printing ink or of the glass printing lacquer.

The glass printing ink according to the invention and the glass printing lacquer according to the invention may comprise one or more fillers. The nature of the fillers is not particularly critical. They may be selected from among conventional fillers used in printing inks, such as for example, without being limited thereto, china clay, barium sulfate (in precipitated form as blanc fixe), calcium carbonate, zinc sulfide, siliceous earth, talcum, aluminium silicate, aluminium hydrate and/or silica. The quantity of filler used is generally in the range from 0 to 50 wt. %, preferably from 10 to 30 wt. %, for example 20 wt. %, relative to the total mass of the glass printing ink or of the glass printing lacquer.

The glass printing ink according to the invention or the glass printing lacquer according to the invention may also contain a thickener which is likewise selected from among conventional materials used for this purpose in inks/lacquers. These include, without being limited thereto, for example pyrogenic silica, phyllosilicates and castor oil derivatives. The quantity of thickener used is usually in the range from 0 to 10 wt. %, preferably from 1 to 5 wt. % and in particular from 1.5 to 3 wt. %, relative to the total mass of the glass printing ink, depending on the type of pigment or glass printing lacquer.

In general, the glass printing ink according to the invention and the glass printing lacquer according to the invention also contain a defoamer and/or a levelling agent, in general in a quantity of 0.5 to 2.5 wt. %, preferably 0.5 to 1.5 and in particular 1 wt. %, relative to the total mass of the glass printing ink or of the glass printing lacquer. Defoamers may, for example, be selected not only from among modified acrylates or modified acrylate copolymers, but also, and preferably, from compounds containing silicone. Levelling agents comprise for example modified polyacrylates and polysiloxanes.

Preferably used stabilisers are Genorad 16 from Rahn and Florstab UV2 from Kromachem, Park Industrial Centre, Tolpits Lane, Watford, Hertfordshire, WD1 8SP, UK.

Prior to printing, a coupling agent may be added to the glass printing ink and the glass printing lacquer in a quantity of 0.1 to 20 wt. %, preferably of 1 to 10 wt. %, relative to the total mass of the glass printing ink or of the glass printing lacquer. These may comprise isocyanate coupling agents, for example aliphatic polyisocyanates, such as hexamethylene diisocyanate (HDI), trimethylhexane diisocyanate (TMHDI), cycloaliphatic polyisocyanates such as isophorone diisocyanate (IPDI), hydrogenated xylylene diisocyanate (HXDI) or diisocyanatodicyclohexylmethane (HMDI), and aromatic polyisocyanates, such as tolylene diisocyanate (TDI), xylylene diisocyanate (XDI), tetramethylxylylene diisocyanate (TMXDI) or diisocyanatodiphenylmethane (MDI). Commercially obtainable products are, for example, Desmodur E41 or Desmodur N 75 (Bayer). Polyimides, such as polyethyleneimides, polycarbodiimides, may be used. Preferred coupling agents are, however, silane coupling agents, such as alkylsilanes, vinylsilanes, methacryloxysilanes, epoxysilanes, aminosilanes, ureasilanes, chlorosilanes and isocyanatosilanes.

Aminosilanes are very particularly preferred, such as gamma-aminopropyltriethoxysilane, gamma-aminopropyltrimethoxysilane, n-beta-(aminoethyl)-gamma-aminopropyl-trimethoxysilane, bis(gamma-trimethoxysilylpropyl)amine, N-phenyl-gamma-aminopropyltrimethoxysilane and N-beta-(aminoethyl)-gamma-aminopropylmethyldimethoxysilane, and isocyanatosilanes, such as gamma-isocyanatopropyl-triethoxysilane.

Articles which may be printed according to the invention include glass, ceramics, tiles and similar articles which are at least superficially vitreous. The invention accordingly also relates to the use of a glass printing ink or of a glass printing lacquer for printing glass, ceramics, tiles and similar at least superficially vitreous substrates.

Such articles may be of any shape or form, such as a container, a sheet, a tile, a figure etc. In a preferred embodiment of the invention, the article is packaging glassware (beverage bottles, cosmetic containers) or commercial glassware.

As used according to the invention, the term "glass" is intended to mean glass, ceramics, tiles and similar vitreous materials.

Before printing, the glass is usually subjected to a pretreatment. This may comprise flame treatment.

One particularly effective pretreatment is the "Uvitro" process from Isimat, Ringelbacherstrasse 38-40, D-73479 Ellwangen. This process is exhaustively described in DE 100 19 926 A1 and U.S. Pat. No. 6,513,435 B2. This process comprises, in a first step, treatment of a glass surface with an oxidising flame (i.e. with an excess of oxygen) usually for 3 to 4 seconds and, in a second step, treatment with a silicatising flame (i.e. a flame into which a silicon compound, for example tetramethoxysilane, is introduced), usually likewise for 3 to 4 seconds.

The glass is then printed. The printing method may comprise screen printing, pad printing, offset printing, flexographic printing or gravure printing. Screen printing is preferred.

The glass printing ink or the glass printing lacquer is hardened with UV light in a wavelength range of 200 to 400 nm over a period which is sufficient to achieve complete hardening. Alternatively, the glass printing ink or the glass printing lacquer may also be hardened without photoinitiators using electron beam radiation.

The entire range of colour shades may be printed. If screen printing is used, a 100-40 to 180-27, preferably 140-34, printing screen is preferably used, which yields an ink film thickness of 5-10 μm. Depending on the printing task and press, hardening proceeds using conventional commercial medium pressure mercury lamps or gallium-doped lamps at 80-400 W/cm, preferably 120 to 200 W/cm, which are substantially focussed. Exposure time is coupled with printing speed, as the printing and exposure devices are coupled. In the case of flash exposure, a printing speed of 40-120 impressions/min is conventional.

After UV hardening, a thermal post-treatment step, for example at a temperature of 130 to 200° C., preferably of 130 to 170° C. and in particular of 150° C. over a period of for example 20 to 40 min, preferably of 30 min, may optionally be performed.

The glass printing ink and the glass printing lacquer exhibit good interlayer adhesion and may be embossed with hot embossing foils.

The following Examples illustrate the invention.

EXAMPLES

Example 1

UVitro pretreatment was carried out on a glass bottle (arcogas FTS 401 flame treatment apparatus (Arcogas GmbH, Rotweg 25, D-71297 Mannheim)):

Burner: MB3 100
1. Preliminary flame treatment 300 l/min (air)-11 l/min (propane/butane)
2. Uvitro 200 l/min (air)-7.5 l/min (Propane/Butane)
Duration: 3-4 seconds in each case
The bottles are then cooled to 35-40° C.

A glass printing ink of the following composition was produced beforehand by dispersion using a 3-roll or bead mill:

| Component | Source | Quantity (wt. %) |
|---|---|---|
| 1,6-Hexanediol diacrylate | LAROMER* HDDA | 6 |
| Stabiliser | FLORSTAB UV-2** | 1 |
| Polysiloxane defoamer | Tego Airex 920*** | 0.5 |
| | Tego Rad 2500**** | 0.5 |
| Photoinitiator 1 | DAROCUR 1173/1173C | 1 |
| Photoinitiator 2 | Lucerin TPO | 4.9 |
| Co-initiator | EBECRYL 7100***** | 4 |
| Pigment | TiO$_2$ | 27.5 |
| 50% epoxy resin solution in HDDA | ARALDITE 7072 50% in Laromer HDDA | 25 |
| Nano-silicon dioxide in melamine acrylate | NANOCRYL XP 21/0793 | 10 |
| 35% MMA copolymer solution in HDDA | PARALOID B60 in HDDA, 35% | 19.6 |
| | | 100 |

*LAROMER is a trademark of BASF
**FLORSTAB UV-2 is a stabiliser from Kromachem
***Tego Airex 920 is a defoamer from Tego Chemie Service GmbH, Goldschmidtstraße 11, D-45127, Essen
****Tego Rad 2500 is a levelling agent from Tego
*****Ebecryl 7100 is an amino-modified acrylate from Surface Specialities UCB A mixture of the components stated in the above Table was mixed with 4 wt. % of diaminosilane (for example N-beta-(aminoethyl)-gamma-aminopropyltrimethoxysilane or N-beta-(aminoethyl)-gamma-aminopropylmethyldimethoxysilane) or with 10 wt. % of gamma-isocyanatopropyltriethoxysilane and printed onto the treated glass bottle by screen printing on an ISIMAT 1000P printing press with a 120-34 printing screen at 60 impressions/min.

Printability is good.

UV hardening proceeds in a UV dryer at approx. 600 mJ/cm$^2$.

The ink was not stoved.

Very good adhesive strength and scratch resistance in the undamaged ink film were achieved. In dishwasher testing in a Winterhalter industrial dishwasher, more than 100 washing cycles could be carried out without any change to the printed image.

The printed bottles could be filled with fruit juice on a filling line without suffering damage to the ink film.

Example 2

A glass ink of the following composition was applied onto untreated flat glass

| Component | Source | Quantity (wt. %) |
|---|---|---|
| 1,6-Hexanediol diacrylate | LAROMER* HDDA | 6.6 |
| Polysiloxane defoamer | Tego Airex 920*** | 0.5 |
| | Tego Rad 2500**** | 0.5 |
| Photoinitiator 1 | DAROCUR 1173/1173C | 1 |
| Photoinitiator 2 | Lucerin TPO | 4.9 |
| Co-initiator | EBECRYL 7100***** | 4 |
| Pigment | TiO$_2$ | 27.5 |
| 50% epoxy resin solution in HDDA | ARALDITE 7072 50% in Laromer HDDA | 25 |
| Acid-modified polyester acrylate | GENOMER 7154 | 30 |
| | | 100 |

(Footnotes See Example 1)
without using a coupling agent by screen printing with a 140-34 printing screen.

UV hardening was performed with a medium pressure mercury lamp at 2×120 W/cm$^2$ at approx 5 m/min.

Good crosshatching resistance (adhesion) was achieved without stoving. Scratch resistance is very good in both the undamaged and damaged film.

In a further test, the ink was then stoved for 30 min at 150° C.

The printing ink for glass then achieved a crosshatching value to EN ISO 2409 of GT 0 immediately after the condensed water test.

Using the glass printing ink of Example 1, good adhesion, scratch resistance and water resistance properties of the resultant ink film were accordingly achieved by two component printing without any requirement for stoving. Using glass printing ink 2, good adhesive strength and scratch resistance properties could likewise be achieved by single component printing without subsequent stoving and, with subsequent stoving, good water resistance of the resultant ink film could additionally be achieved. This amounts to a simplification of the printing method in comparison with prior art printing methods.

It should be emphasized that the above-described embodiments of the present invention, particularly, any "preferred" embodiments, are possible examples of implementations merely set forth for a clear understanding of the principles of the invention. Many variations and modifications may be made to the above-described embodiments of the invention without substantially departing from the spirit and principles of the invention. All such modifications are intended to be included herein within the scope of this disclosure and the present invention, and protected by the following claims.

The invention claimed is:
1. A glass printing ink or glass printing lacquer consisting of:
at least two resins, which together yield a photo-hardenable mixture, and a cross-linking initiator,
wherein one of the at least two resins comprises a bisphenol A based epoxy resin, diluted in a UV hardening monomer, and
an other of the at least two resins is selected from the group consisting of: a melamine acrylate; an acid-modified polyester acrylate and an epoxy acrylate, and
wherein the cross-linking initiator consists of a co-initiator and a photoinitiator, wherein the photoinitiator selected from the group consisting of: 1-hydroxycyclohexylacetophenone; 2-methyl-1-[4-(methylthio-phenyl)-2-morpholinopropan]-1-one; 2-benzyl-2-dimethylamino-1-(4-morpholinophenyl)-butan-1-one; bis(2,4,6-trimethylbenzoyl)phenylphosphine oxide; 2-hydroxy-2-methyl-1-phenyl-1-propanone; isopropylthioxanthone;

2-chlorothioxanthone; benzophenone, 2,4,6-trimethylbenzoyldiphenylphosphine oxide; ethyl 2,4,6-trimethylbenzoyl-phenylphosphinate; methylbenzoyl formate; and, mixtures thereof.

2. The glass printing ink or glass printing lacquer of claim 1, wherein the epoxy resin is used in a quantity of 1 to 90 wt. % relative to the weight of the glass printing ink or of the glass printing lacquer.

3. The glass printing ink or glass printing lacquer of claim 1, wherein the other of the at least two resins is used in a quantity of 5 to 90 wt. % relative to the weight of the glass printing ink or of the glass printing lacquer.

4. The glass printing ink or glass printing lacquer of claim 1, wherein the at least one photoinitiator is present in a total quantity of 1 to 12 wt. % relative to the weight of the glass printing ink or of the glass printing lacquer.

5. The glass printing ink or glass printing lacquer claim 1, wherein the UV hardening monomer is hexanediol diacrylate.

6. The glass printing ink or glass printing lacquer of claim 1, further consisting of a UV hardening reactive diluent other than the UV hardening monomer.

7. The glass printing ink or glass printing lacquer of claim 1, further consisting of a stabilizer.

8. The glass printing ink or glass printing lacquer of claim 1, further consisting of one or more pigments or dyes in a quantity of 0.5 to 50 wt. %, relative to the total weight of the ink.

9. The glass printing ink or glass printing lacquer of claim 1, wherein the bisphenol A based epoxy resin exhibits a weight average molecular weight in the range of substantially 800 to 1500.

10. A glass printing ink or glass printing lacquer consisting of:
at least two resins, which together yield a photo-hardenable mixture, and a cross-linking initiator,
wherein one of the at least two resins comprises a bisphenol A based epoxy resin, diluted in a UV hardening monomer, and
an other of the at least two resins is selected from the group consisting of: a melamine acrylate; an acid-modified polyester acrylate and an epoxy acrylate, and
wherein the cross-linking initiator consists of a photoinitiator selected from the group consisting of: 1-hydroxy-cyclohexylacetophenone; 2-methyl-1-[4-(methylthiophenyl)-2-morpholinopropan]-1-one; 2-benzyl-2-dimethylamino-1-(4-morpholinophenyl)-butan-1-one; bis(2,4,6-tri-methylbenzoyl)phenylphosphine oxide; 2-hydroxy-2-methyl-1-phenyl-1-propanone; isopropylthioxanthone; 2-chlorothioxanthone; benzophenone, 2,4,6-trimethylbenzoyldiphenylphosphine oxide; ethyl 2,4,6-trimethylbenzoyl-phenylphosphinate; methylbenzoyl formate; and, mixtures thereof.

* * * * *